April 28, 1931. O. C. KAVLE 1,802,655
LATHE CHUCK
Filed July 12, 1927 2 Sheets-Sheet 1

INVENTOR
O. C. Kavle

April 28, 1931. O. C. KAVLE 1,802,655
LATHE CHUCK
Filed July 12, 1927 2 Sheets-Sheet 2
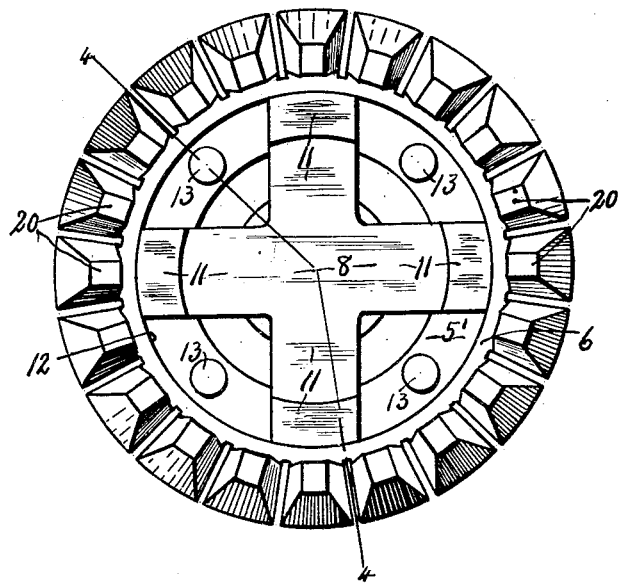
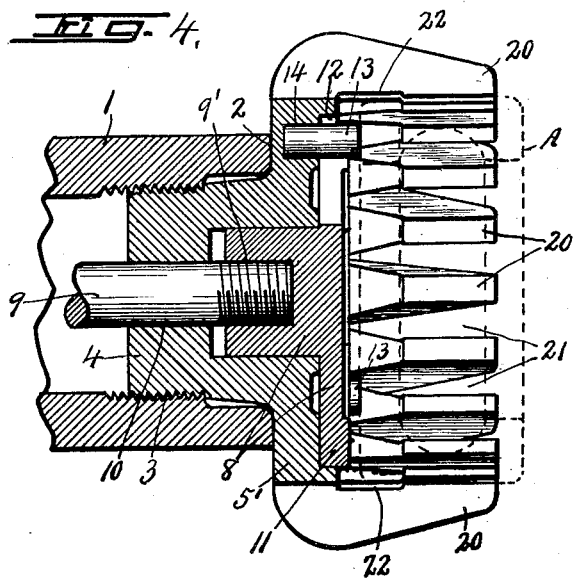

Patented Apr. 28, 1931

1,802,655

UNITED STATES PATENT OFFICE

OSCAR C. KAVLE, OF SYRACUSE, NEW YORK

LATHE CHUCK

Application filed July 12, 1927. Serial No. 205,142.

This invention relates to chucks adapted to be adapted to the driving shaft or mandrel of a lathe or analogous machine for receiving and holding the work preparatory to machining interior parts thereof and is specifically adapted for the reception and retention of objects having cylindrical peripheries of known external diameter such, for example, as ball-retainer rings for journal bearings.

The main object is to provide a self-centering chuck with a circumferential series of resilient jaws arranged in uniformly spaced relation circumferentially in such manner that the objects to be machined may be pressed axially into the chuck and against the inner faces of the jaws with the assurance that the objects will be frictionally held exactly co-axial with the mandrel with sufficient firmness to rotate with the chuck and thus permit the interior of the objects to be machined in any manner desired without disturbing the co-axial relation between the object and mandrel.

Another object is to provide the entire chuck with stops for limiting the axial movement of the work into the chuck and thereby to assure more perfect alinement of the axes of the work and mandrel when engaged with the resilient jaws.

A further object is to provide means for expelling the finished work from the jaws.

Other objects and uses relating to specific parts of the device will be brought out in the following description.

In the drawings:—

Figure 3 is an end view of a chuck showing a slightly modified form of my invention.

Figure 4 is a longitudinal sectional view taken in the plane of line 4—4, Figure 3.

Figure 1:
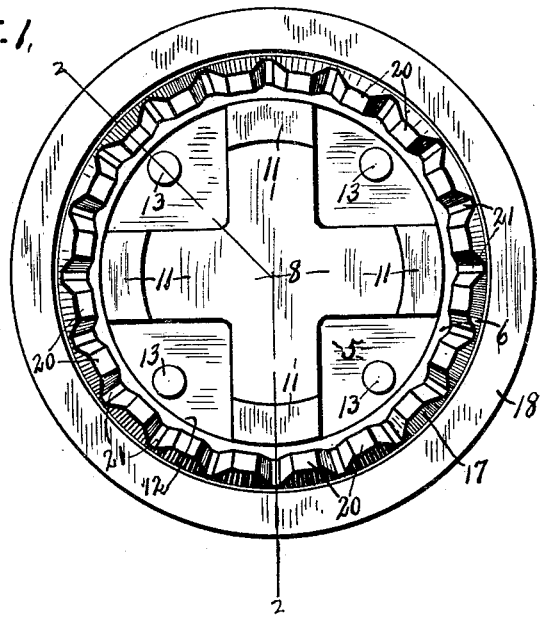
Figure 1 is an end view of a chuck showing one form of my invention.

The device shown in Figure 1 comprises a hollow rotary driving shaft or mandrel —1— having its end face —2— adjacent the chuck disposed in a plane at substantially right angles to the axis of the shaft and its adjacent inner periphery threaded at —3— for receiving an externally threaded hub —4— of a chuck head —5—.

This chuck head —5— beyond the hub —4— is enlarged and preferably cylindrical and is provided with a correspondingly enlarged chamber —6— open at one end opposite the hub —4— for receiving the work which is to be machined.

The end wall of the chamber —6— is provided with a reduced cylindrical socket —7— extending into the hub —4— co-axial with the mandrel —1— for receiving the cylindrical hub of an ejector —8— which is movable axially in the socket —7— and is provided with a co-axial operating rod —9— extending through an opening —10— in the end wall of the socket —7— and adapted to be connected to any suitable operating mechanism by which the rod —9— and ejector —8— may be moved axially in reverse directions.

The ejector —8— is provided with a plurality of, in this instance, four radial arms —11— projecting beyond the periphery of its hub in a plane at right angles to the axis thereof and adapted to normally seat in an annular recess —12— in the inner face of the end wall of the chamber —6— so as to normally project a slight distance into said chamber when withdrawn to its extreme outward position.

The ejector arms —11— are arranged in uniformly spaced relation circumferentially and their outer ends are provided with similar contact faces projecting inwardly slightly beyond the remaining portions thereof for contact with the end face of the work when ejecting the latter from between the jaws, presently described, it being understood that the end faces of the contact members are disposed in a plane at right angles to the axis of the mandrel —1—.

The end wall of the chamber —6— is provided with a plurality of, in this instance four, stop pins —13— arranged in uniformly spaced relation circumferentially about the axis of the mandrel —1— and parallel therewith with their inner end faces disposed in a plane at right angles to the axis of the mandrel and slightly beyond the inner faces of the contact members of the arms —11— when the ejector is in its normal position for limiting the inward movement of the work into the chuck and also to assist in centering the work co-axial with the mandrel by causing the work to seat therewith against when inserted between the jaws of the chuck.

These stop pins —13— are preferably located midway between the arms —11— of the ejector —8— and, as illustrated, are seated in sockets —14— in the end wall of the chamber —6— but obviously may be otherwise formed, if desired.

Figure 2:
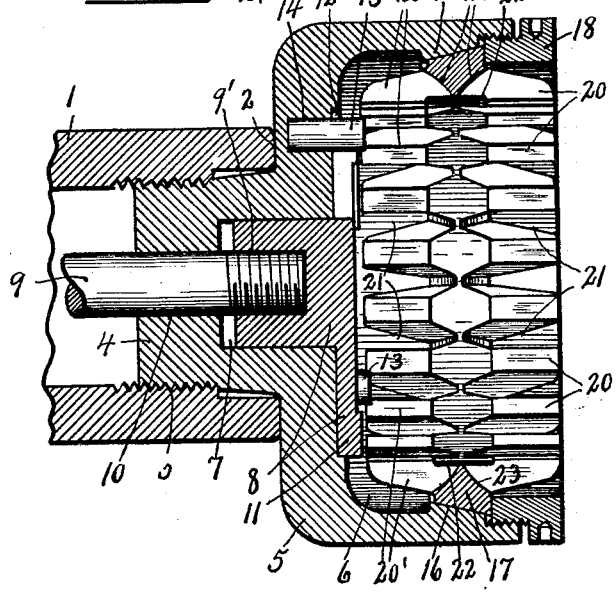
Figure 2 is a longitudinal sectional view taken in the plane of line 2—2, Figure 1.

The rod —9— for operating the ejector —8— is preferably threaded at its inner end and engaged in its threaded socket —15— in the hub of the ejector as shown in Figure 2.

The peripheral wall of the chuck head —5— is provided near its open end with an inner annular flange —15— having an inwardly tapered annular friction surface —16— for receiving the similarly tapered periphery of an annular friction ring —17— which is held in operative position against endwise displacement and also in frictional engagement with the bearing surface —16— by means of an externally threaded locking ring —18— engaging the internally threaded open end of the head —5— as shown in Figure 2.

The friction ring —17— is provided with opposite sets of jaws —20— and —20'— projecting axially in opposite directions from the tapered portion of the ring, those of each set being arranged in uniformly spaced relation circumferentially about the axis of the chuck thereby forming a corresponding number of intervening grooves —21—.

The jaws of both sets are preferably arranged in axial alinement and the inner faces of their outer ends are parallel with the axis of rotation of the chuck so as to grip the peripheral surface of the work with uniform position through their lengths.

The jaw-supporting ring —17— including its jaws —20— and —20'— are preferably made of steel suitably tempered to render the jaws sufficiently resilient to yield under pressure of the work when inserted into the chuck and thereby to establish a sufficient frictional grip upon the work to cause the latter to rotate with the head —5— during the machining operations within or upon the work.

This resiliency of the jaws is made possible by the peculiar construction thereof in that the peripheries of each set of jaws are tapered axially from the ring —17— relatively to the axis of rotation while their opposite sides are also tapered outwardly at similar angles to their longitudinal centers so that the resiliency of each tooth gradually diminishes from its outer end to the ring —17— thereby distributing the resilient action throughout the length of the jaw and reducing the liability of crystalization at anyone particular cross section of the jaw.

This resiliency is further increased by recessing the inner edges of the jaws at —22— near their junctions with the ring —17— and also by beveling the inner edges of the ring at —23— between the jaws so that the inner portions of the jaws may extend inwardly some distance beyond the opposite ends of the ring thereby extending the resiliency of the jaws inwardly beyond the corresponding ends of the ring.

In Figures 3 and 4 a single set of jaws, as —20—, are formed directly upon the periphery of the head as —5'— to extend axially therefrom and preferably integral therewith in which case the jaws and head would be properly tempered to impart the desired resiliency to the jaws thereby simplifying the construction by avoiding the outer part of the ring —17— and nut ring —18— and at the same time permitting the use of longer jaws with correspondingly increased resiliency.

Operation

As previously intimated, this chuck is particularly useful in places where large numbers of similar objects of equal radius are to be further machined and consequently the interior diameter of the grip surfaces of the jaws of the chuck are made slightly less than the external diameter of the work as —A—, shown by dotted lines in Figure 4 so that when the work is pressed by hand or otherwise, axially, between the jaws the latter will be sprung outwardly uniformly until the inner end of the work is seated against the stop pins —13— at which time the friction of the jaws under their own tension against the periphery of the work and firmly hold the latter in operative position co-axial with the axis of rotation of the mandrel —1— until such further operations as may be necessary are performed upon the work.

When these operations are completed the ejector —8— may be forced axially by means of its operating rod —9— to engage the inner face of the work and expell the same from the jaws of the chuck following which the ejector —8— may be withdrawn by the same means rearwardly for a repetition of the operation previously described.

This chuck is particularly useful for holding relatively thin annulæ or tubular parts in that they may be automatically centered and frictionally held in the chuck without liability of distortion or deformation as distingushed from the usual type of jaw chuck, which, when tightened upon this class of work is more or less liable to crush or deform the work.

What I claim is:—

1. In a lathe chuck, a jaw-supporting member, a circular series of resilient jaws secured to and projecting axially from said member in uniformly spaced relation circumferentially about a common axis for receiving and frictionally supporting an object, and stops arranged about said axis some distance therefrom and having their work-engaging faces disposed in a plane at right angles to the axis of said member for limiting the endwise movement of the work into the chuck.

2. A lathe chuck comprising a rotary head having a central coaxial socket, an ejector hub movable endwise in said socket and provided with radially projecting work-engaging arms in uniformly spaced relation circumferentially, work-engaging stops secured to said head around the socket and between the ejector arms, said head having an annular flange extending axially some distance beyond the ejector and stops and provided with an inner axially tapered annular bearing, a tapered ring engaging said bearing, and a follower engaging said ring and in screw engagement with said flange for tightening and releasing against and from said bearing.

3. In a lathe chuck, a rotary head having a central co-axial socket, an ejector hub movable endwise in said socket and provided with radially projecting work-engaging arms, work-engaging stops secured to said head around the socket between said arms, and means for moving the ejector hub axially.

In witness whereof I have hereunto set my hand this 7th day of July, 1927.

OSCAR C. KAVLE.